US011223994B2

(12) United States Patent
Yang et al.

(10) Patent No.: US 11,223,994 B2
(45) Date of Patent: Jan. 11, 2022

(54) SYSTEM AND METHOD FOR ULTRA-LOW LATENCY SHORT DATA SERVICE

(71) Applicant: Verizon Patent and Licensing Inc., Arlington, VA (US)

(72) Inventors: Jin Yang, Orinda, CA (US); Ye Huang, San Ramon, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 16/689,506

(22) Filed: Nov. 20, 2019

(65) Prior Publication Data

US 2021/0153095 A1  May 20, 2021

(51) Int. Cl.
| *H04W 40/02* | (2009.01) |
| *H04W 8/00* | (2009.01) |
| *H04W 24/08* | (2009.01) |
| *H04L 12/26* | (2006.01) |
| *H04W 80/12* | (2009.01) |

(52) U.S. Cl.
CPC ............ *H04W 40/02* (2013.01); *H04L 43/04* (2013.01); *H04W 8/005* (2013.01); *H04W 24/08* (2013.01); *H04W 80/12* (2013.01)

(58) Field of Classification Search
CPC ..... H04W 40/02; H04W 8/005; H04W 24/08; H04W 80/12; H04W 48/18; H04L 43/04
See application file for complete search history.

(56) References Cited

U.S. PATENT DOCUMENTS

| 10,798,617 | B1* | 10/2020 | Ghadge | H04W 36/32 |
| 2018/0368157 | A1* | 12/2018 | Jeon | H04L 5/0044 |
| 2019/0260807 | A1* | 8/2019 | Joul | H04L 65/104 |
| 2019/0356742 | A1* | 11/2019 | Ali | H04L 67/143 |
| 2019/0372837 | A1* | 12/2019 | Yang | H04L 43/08 |
| 2020/0120446 | A1* | 4/2020 | Stammers | H04L 67/1021 |
| 2020/0178149 | A1* | 6/2020 | Seenappa | H04W 8/02 |
| 2020/0178198 | A1* | 6/2020 | Ding | G07C 5/008 |
| 2021/0144613 | A1* | 5/2021 | Colom Ikuno | H04L 45/34 |

* cited by examiner

*Primary Examiner* — Hassan Kizou
*Assistant Examiner* — Hector Reyes (57) ABSTRACT

Systems and methods provide a short data, low latency service using a Multi-access Edge Computing (MEC) network. A network device receives, in a core network, an attach request from an end device and detect whether a packet size range for data transmissions from the end device is within a configured size threshold. The network device directs, when the packet size is within the configured size threshold, routing of the data transmissions via a control plane function of an edge network to a local instance of an application server in the edge network. The network device directs, when the packet size is over the configured size threshold, routing of the data transmissions via a user plane function of the edge network to a local instance of an application server in the edge network.

20 Claims, 7 Drawing Sheets

SYSTEM AND METHOD FOR ULTRA-LOW LATENCY SHORT DATA SERVICE

BACKGROUND

The Internet of Things (IoT) may be described as a network of physical objects or "things" embedded with various types of electronics, software, sensors, logic, circuitry, etc., that can collect and exchange data. A "thing" (referred to herein as an "end device" or, alternatively, an "IoT device") may connect to a service hosted, for example, on the Internet. Since IoT technology has nearly limitless applications that can be leveraged to form new and useful services, interest among service providers and developers in IoT technology continues to increase. In many instances, IoT data is useful to individual consumers for monitoring, alerts, historical trends, etc., related to individual devices. In other cases, IoT data can be used by the device makers or service entities associated with each IoT device for monitoring their products or services.

New broadband cellular networks can provide various services and applications to user devices with minimal latency. For example, the use of Multi-access Edge Computing (MEC) platforms (also referred to as Mobile Edge Computing platforms) allows high network computing loads to be transferred onto edge servers, which can minimize latency and reduce backhaul, depending on the location of the edge servers relative to the point of attachment (e.g., a wireless station for a user device).

DETAILED DESCRIPTION OF PREFERRED EMBODIMENTS

The following detailed description refers to the accompanying drawings. The same reference numbers in different drawings may identify the same or similar elements.

The Internet-of-Things (IoT) environment provides massive amounts of data. IoT devices may collect and provide data related to health, property, activity, environment, and the like (referred to herein as IoT data). Certain types of applications or services, including some IoT-based services, require low latency data transmissions, which can be achieved by using Multi-access Edge Computing (MEC) platforms.

In an increasing number of use cases, IoT devices generate short data segments (e.g., about 250 bytes or less). In some instances (e.g., for networks without MEC platforms), Non-Access Stratum (NAS) signaling has been used to send or receive small amounts of IoT data over a control plane of a core network. By using NAS signaling over the control plane, IoT devices may conduct non-IP communication that does not require the establishment of an Internet Protocol (IP) bearer and, therefore, can reduce latency and save computing resources. For MEC platforms, however, control plane signaling (such as used with NAS) limits the benefits of edge computing by routing control packets away from network edges and back to control plane devices located in the core network (e.g., a mobility management entity (MME) or access and mobility management function (AMF)).

Since the timing of network communications can affect the user experience and/or the integrity of a service, it is beneficial to achieve the lowest possible latency for short data transmissions used by certain types of applications or services. More particularly, network configurations are needed that can apply the efficiencies of control-plane communications for short data segments with the location advantages and low latencies of MEC platforms.

Systems and methods described herein provide both a user plane function and a control plane function at a MEC edge, where short data transmissions (SDTs) use a localized control plane instead of a traditional user plane. SDTs over the control plane may use non-IP communications, which can reduce latency within the MEC network. The short data transmissions may be limited to a configurable data size (e.g., a value of not more than about 500 bytes) and may be identified based on use of dedicated traffic-type identifiers, such as a Public Land Mobile Network Identifier (PLMN-ID). A localized mobility management entity (MME)-SDT function may be instantiated at a MEC edge to support a short data, low latency service, allowing control plane communications to reside entirely on the local MEC platform after an initial authentication and setup. As described further herein, other localized network functions and application programming interfaces (APIs) are provided at the MEC edge to support MEC control plane data delivery with minimal latency.

Figure 1:
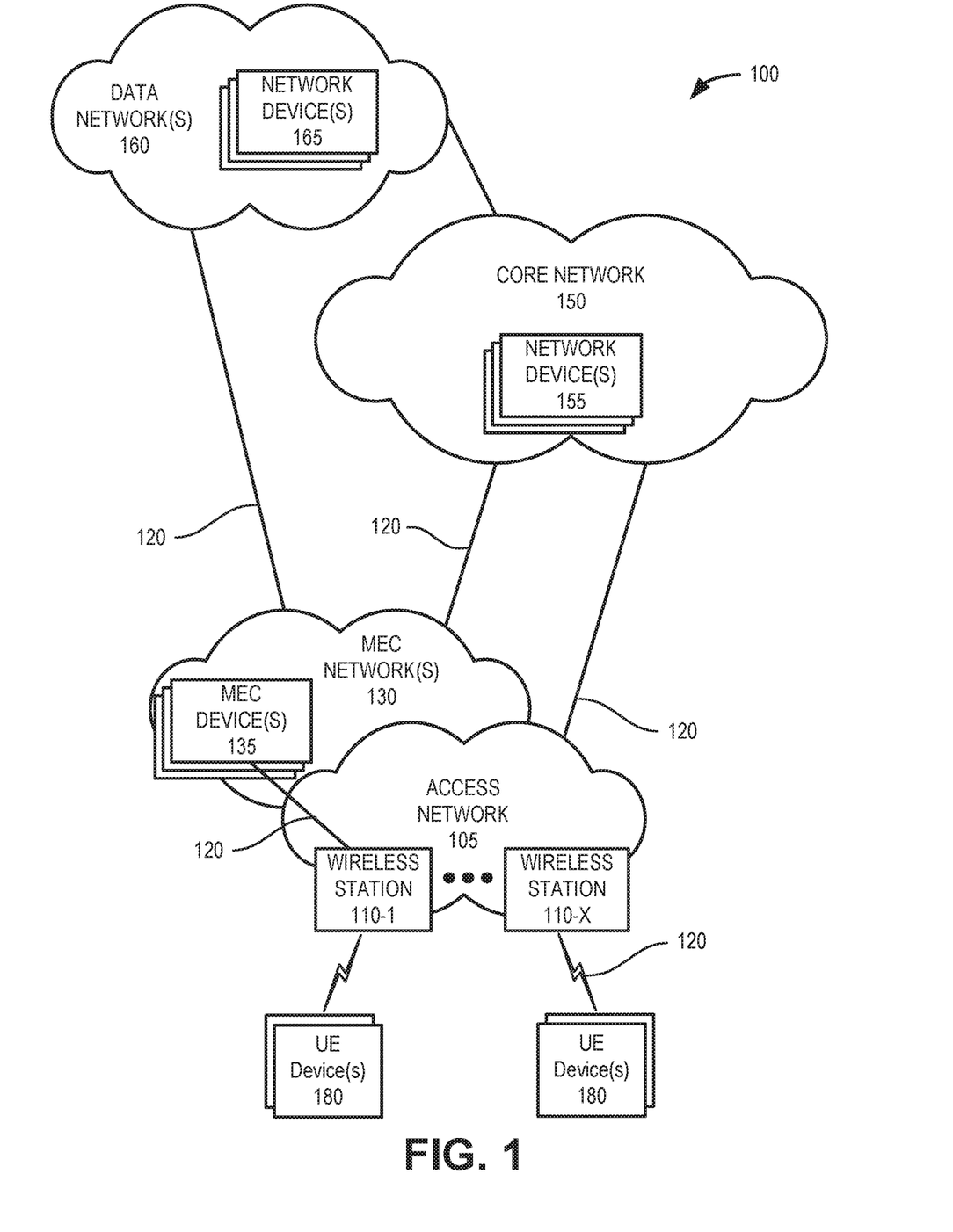
FIG. 1 is a diagram illustrating an exemplary network environment in which a short data, low latency service described herein may be implemented.

FIG. 1 illustrates an exemplary environment 100 in which an embodiment of the short data, low latency service may be implemented. As illustrated, environment 100 includes an access network 105, one or more MEC networks 130, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple UE devices 180.

The number, the type, and the arrangement of network devices and the number of UE devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UE devices 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include a gNB with multiple distributed components, such as a central unit (CU), a distributed unit (DU), a remote unit (RU or a remote radio unit (RRU)), or another type of distributed arrangement.

MEC network 130 (also referred to as an "application service layer network") may include a platform that provides application services, such as the short data, low latency service, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a CU). In other embodiments, wireless stations 110 may connect to MEC network 130 via wired (e.g., optical) backhaul links 120.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include a Next Generation Core (NGC) for a 5G network, an Evolved Packet Core (EPC) of an LTE network, an LTE-A network, an LTE-A Pro network, and/or a legacy core network. According to one implementation, core network 150 may support dual coverage using 4G and 5G networks, referred to as interoperability Option 3x, or other dual coverage options. Core network 150 may manage communication sessions for UE devices 180. For example, core network 150 may establish an Internet Protocol (IP) connection between UE device 180 and a particular data network 160. Furthermore, core network 150 may enable UE device 180 to communicate with an application server or another type of network device 165 located in a particular data network 160 using a communication method that does not require the establishment of an IP connection between UE device 180 and data network 160, such as, for example, Data over Non-Access Stratum (DoNAS).

Depending on the implementation, core network 150 may include various network elements that may be implemented in network devices 155. Such network elements may include an MME, a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 150. In the context of a 4G network that is configured to support 5G UE devices, core network 130 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UE devices 180 (also referred to herein as "end devices 180") may be implemented as a machine-type communications (MTC) device, an Internet of Things (IoT) device, a machine-to-machine (M2M) device, etc., that includes communication functionality, such as a home appliance device, a home monitoring device, a surveillance camera, a medical monitoring device, etc. In other implementations, UE devices 180 may each include a mobile device, such as wireless or cellular telephone device (e.g., a conventional cell phone with data processing capabilities), a smart phone, a personal digital assistant (PDA) that can include a radiotelephone, etc. In another implementation, UE device 180 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. As described further herein, UE devices 180 may be configured for certain types of communications in network environment 100. For example, UE device 180 may be associated with an identifier such as PLMN-ID or network slice selection assistance information (NSSAI) that governs particular types of network traffic, such as traffic for the short data, low latency service.

Figure 2:
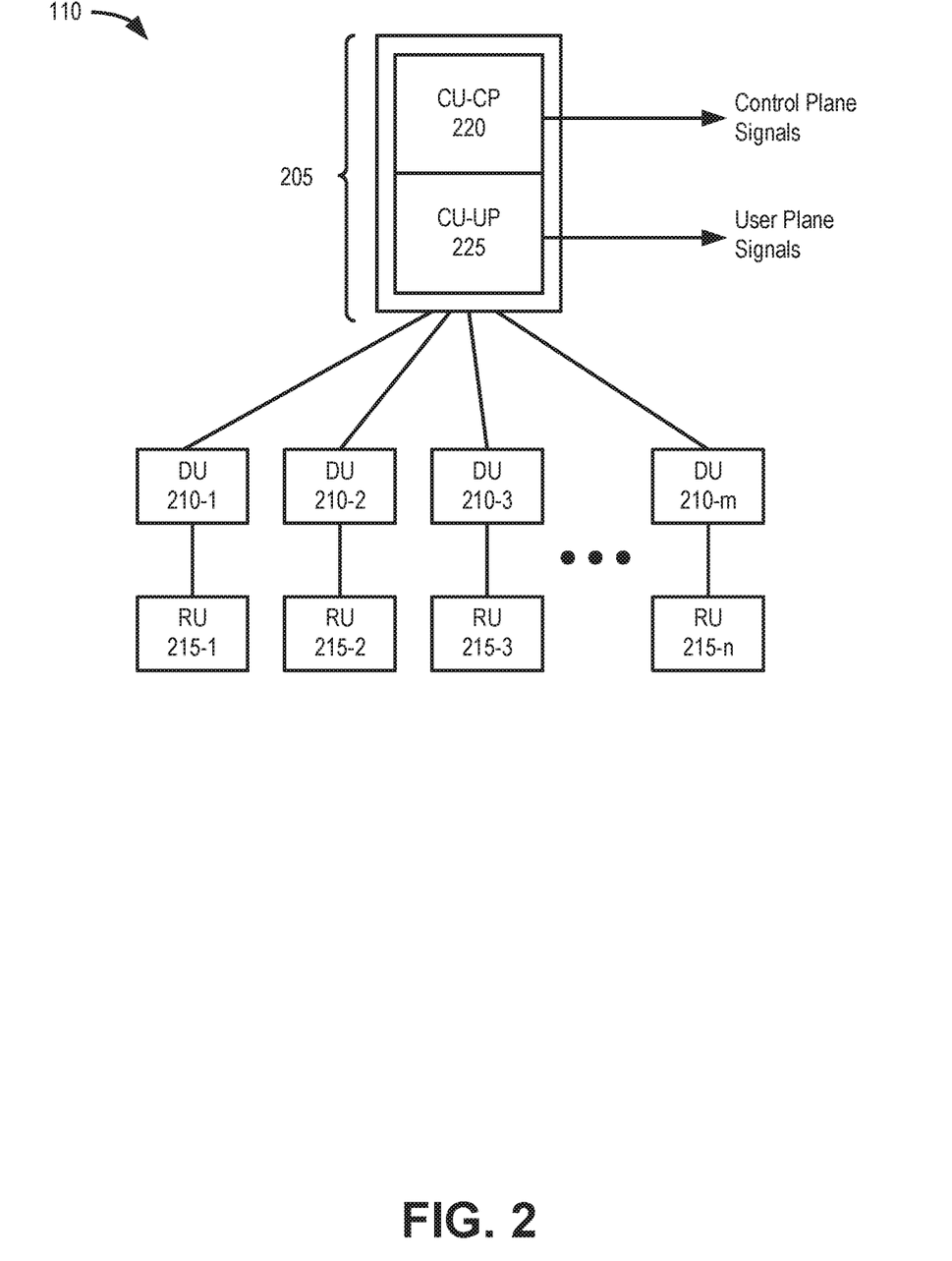
FIG. 2 is a block diagram illustrating an exemplary architecture for a wireless station 110 of network environment of FIG. 1.

FIG. 2 is a block diagram illustrating an exemplary architecture for a wireless station 110 of network environment 100. Wireless station 110 may, in one implementation, include a New Radio (NR) Next Generation gNodeB used in a 5G mobile network for access network 105. Wireless station 110 may include a centralized unit (CU) 205, at least one distributed unit (DU) 210, and at least one radio unit (RU) 215.

CU 205 controls the transport of data (e.g., data packets) received at a RU 215 via wireless RF transmissions from a UE device 180 and controls the transport of data from the wireless network to a DU 210 and RU 215 for wireless transmission to a destination UE device 180. As shown, CU 205 may be divided into two subcomponents: a CU-Control Plane (CP) component 220 (referred to herein as "CU-CP 220") and a CU-User Plane (UP) component 225 (referred to herein as "CU-UP 225"). The CU-CP 220 includes a logical node that hosts Radio Resource Control (RRC), and other control plane, functions (e.g., Service Data Adaptation Protocol (SDAP), and Packet Data Convergence Protocol (PDCP)). In some implementations, the CU-CP 220 may additionally host a radio slice controller. The radio slice controller may select a particular DU 110 and a particular CU-UP 125 for routing and transporting data to and from a UE device 180 for a given data session based on, for example, a performance profile associated with the DU 110, a user profile associated with the UE, and/or network performance requirements associated with the network service, application, or traffic involved in the data session.

The CU-UP 225 includes a logical node that hosts user plane functions, such as, for example, data routing and transport functions. As described in further detail below, CU-CP 220 and CU-UP 225 of CU 205 may include distributed nodes that may be located remotely from one another. Multiple distributed CU-CP 220s and/or multiple CU-UPs 225 may be positioned at different locations within a network (not shown). A selected one of the CU-CPs 220 and a selected one of the CU-UPs 225 may be used for handling traffic from one or more UEs (not shown).

DU 210 of wireless station 110 may, in some implementations, include multiple DUs 210-1 through 210-*m*. Each DU 210 of the multiple DUs includes a logical node that hosts functions associated with the Radio Link Control layer, the Medium Access Control (MAC) layer, and the physical layer (PHY). The RU 215 may include multiple RUs 215-1 through 215-*n*. Each RU 115 may include at least one radio transceiver, and associated antenna(s), for RF wireless communication with one or more UE devices 180 (not shown in FIG. 2).

Figure 3:
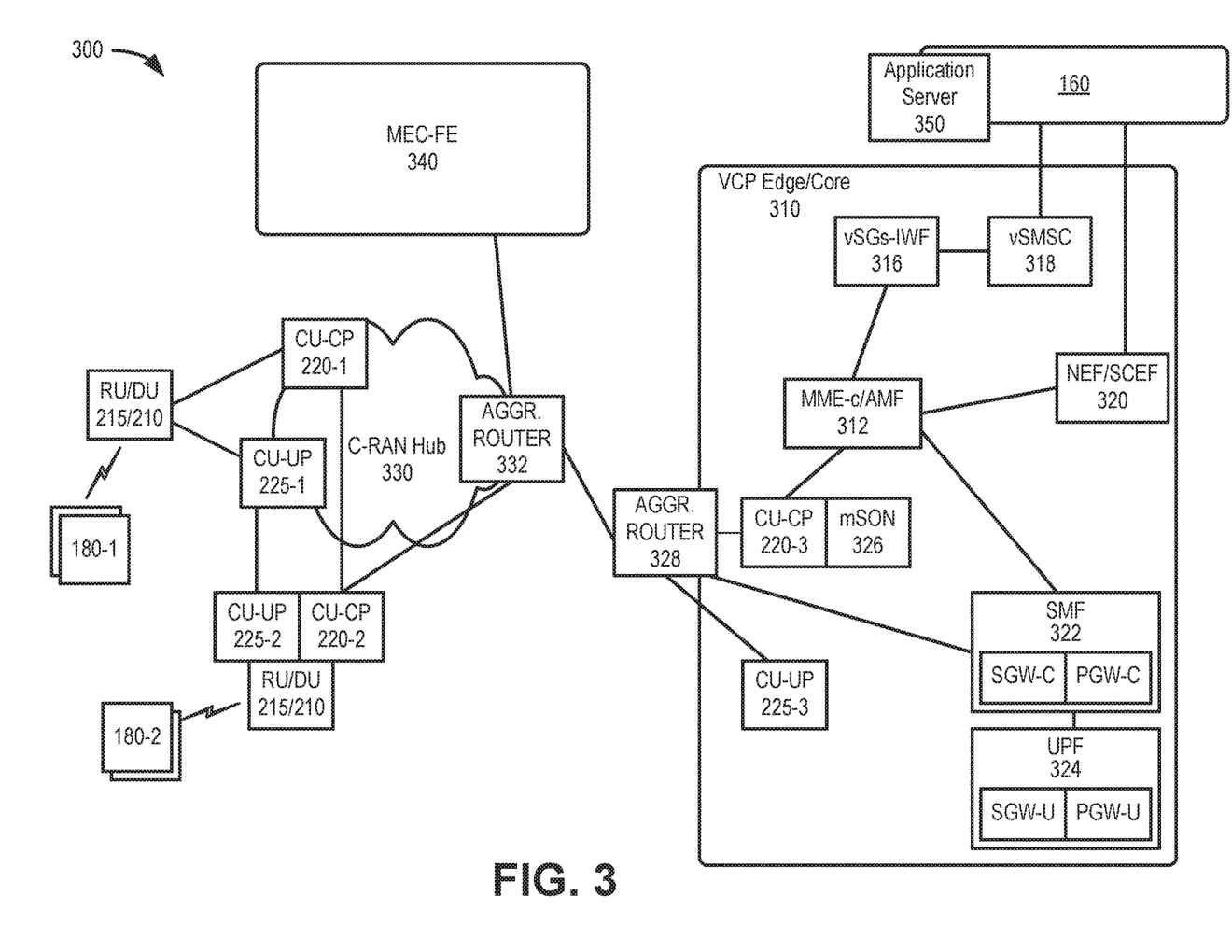
FIG. 3 is a block diagram of illustrating exemplary network components in a portion of network environment of FIG. 1.

FIG. 3 is a block diagram of a portion 300 of network environment 100 that may be used in the short data, low latency service. As shown in FIG. 3, network portion 300 may include, for example, a virtualized controller platform (VCP)/core 310, a centralized-RAN (C-RAN) hub 330, a MEC-far edge (FE) 340, and data network 160. In other implementations, network portion 300 may include a different composition and/or configuration of inter-connected networks. For example, though only a single edge cloud 320 is shown in FIG. 3, network environment 300 may include multiple MEC-FEs 340 connected to VCP/core 310 and/or data network 160.

VCP/core 310 includes the core components of a wireless network that serves to provide wireless access to subscribing UE devices 180. Components of VCP/core 310 may be included in core network 150 (e.g., network devices 155) or included in a centralized portion of MEC network 130 (e.g., MEC devices 135). The wireless network may include any type of wireless network that provides wireless access and connectivity to UE devices 180. The wireless network may include, for example, a PLMN or a satellite network. In the case of a 5G wireless network that also supports 4G connections, the core components may include, among other components, a combined MME-core (MME-c)/AMF device 312, a virtual serving gateway and internetworking function (vSG-IWF) 316, a virtual Short Message Service Center (vSMSC) 318, a combined Service Capability Exposure Function and Network Exposure Function (SCEF/NEF) 320, a core-implemented SMF 322, a core-implemented UPF 324, CU-CP 220-3, and CU-UP-225-3. In the case of a dedicated 5G wireless network, or other types of wireless networks, VCP/Core 310 may include different components that possibly perform different functions than the components of a combined 5G/4G wireless network.

MME-c/AMF 312 may include a network or computational device that implements control plane processing for access network 105 and/or core network 150. For example, MME-c/AMF 312 may direct routing for UE device 180, may activate and deactivate bearers for UE device 180, may authenticate a UE device 180, and may interface to non-4G/5G radio access networks. A bearer may represent a logical channel with particular quality of service (QoS) requirements. MME-c/AMF 312 may also select a particular SCEF/NEF 320 (or a local MEC instance of an SCEF/NEF, as described below) for a particular UE device 180. A particular MME-c/AMF 312 may interface with SCEF/NEF 320 via a non-IP APN via a packet data network (PDN) connection. According to an implementation described further herein, MME-c/AMF 312 may perform initial authentication and setup for UE devices 180 that use the short data, low latency service. According to an implementation, MME-c/AMF 312 may control the message routing based on detection of dedicated PLMN-IDs, subscriber profile IDs (SPIDs), bootstrap server IDs (BSIDs), traffic types, or NSSAIs. In a mobility context, MME-c/AMF 312 may serve as an anchor to support MEC transitions and handovers for UE device 180.

vSGs-IWF 316 may interface access network 1105 with vSMSC 318. For example, each vSGs-IWF 316 may be assigned a subset of the UE devices 180 associated with MME-c/AMF 312. vSGs-IWF 316 may receive a data transmission, such as a short message (SM), from MME-c/ AMF 312 and may provide the SM to vSMSC 318. vSGs-IWF 316 may communicate with MME-c/AMF 312 over a link implemented as an SGs interface. The SGs interface may be implemented, for example, using SGs Application Part (SGsAP) protocol and/or Stream Control Transmission Protocol (SCTP).

vSMSC 318 may receive an SM from UE device 180 via vSGs-IWF 316 and may route or switch the SM to application server 350 if application server 350 is the intended recipient of the SM. Moreover, vSMSC 318 may receive an SM from application server 350 and may route or switch the SM to UE device 180 via vSGs-IWF 316 if UE device 180 is the intended recipient of the SM.

SCEF/NEF 320 may include a network or computational device that provides the capability for the creation, verification, and testing of MTC services. In one implementation, SCEF/NEF 320 may exchange control plane signaling with MME-c/AMF 312. According to an implementation described herein, SCEF/NEF 320 may act as a gateway for connecting UE device 180 to application server 350. Generally, SCEF/NEF 320 may expose application-programming interfaces (APIs) for multiple application servers (such as application server 350) to access network services to communicate with UE devices 180. UE device 180 may set up a non-IP PDN connection towards SCEF/NEF 320, and SCEF/NEF 320 will have connectivity towards application server 350. In this way, SCEF/NEF 320 may facilitate communication between UE device 180 and application server 350.

SMF/PGW-C/SGW-C 322 may include a network device (e.g., a converged node) to maintain an anchor point for intra/inter-RAT mobility, maintain an external Packet Data Unit (PDU) point of interconnection to a data network (e.g., data network 160), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., wireless station 110), and/or perform other types of user plane processes.

UPF/PGW-U/SGW-U 324 may include a network device (e.g., a converged node) that provides UPF functionality for 5G network access and user plane functionality for 4G network access. UPF/PGW-U/SGW-U 324 may communicate with SMF/PGW-C/SGW-C 322 using an N4 interface and connect to data network 160 using an N6 interface.

C-RAN hub 330 may include a centralized office "hotel" at which multiple CU-CPs 220 are located to enable efficient and cost-effective network access. As described further herein, C-RAN hub 330 may connect to VCP/core 310 and MEC-FE 340, as shown in FIG. 3, to facilitated routing for the short data, low latency service. According to an implementation, C-RAN hub 330 may include an aggregation router 332. Aggregation router 332 may route, for example, IoT traffic from UE devices 180 to VCP/edge core 310 or MEC-FE 340.

MEC-FE 340 may be an edge location within MEC network 130. According to one implementation, MEC-FE 340 may be the closest edge location to a wireless station being accessed by UE device 180. MEC-FE 340 may be configured to include both user plane functions and control plane functions through which IoT traffic from UE devices 180 may be routed. The IoT traffic may be routed through one of the user plane or the control plane of MEC-FE 340 depending on packet size. Packet size may be determined, for example, based on detection of dedicated PLMN-IDs, subscriber profile IDs (SPIDs), bootstrap server IDs (BSIDs), traffic types, or NSSAIs when UE device 180 attaches to the network. MEC-FE 340 is described further in connection with FIG. 4.

Application server 350 may include one or more devices, such as computer devices, databases, and/or server devices, that facilitate non-IP data delivery services. Such services may include supporting IoT applications such as alarms, sensors, medical devices, metering devices, smart home devices, wearable devices, retail devices, etc. Other services may also be supported such as communications applications (e.g., short message service (SMS), etc.), automotive applications, aviation applications, etc. Application server 350 may communicate with UE devices 180 over VCP/edge core 310 using IP and/or non-IP bearer channels. While only one application server 350 is shown in FIG. 3, in various embodiments, multiple application servers may be associated with different entities and used within environment 300. Application servers 350 may be supported by service providers associated with various organizations (e.g., companies, non-profits, collaborative enterprises, etc.).

As shown in FIG. 3, a CU-CP 220 may be located at various locations within network environment 300 based on, among other factors, the different network performance requirements (e.g., latency requirements) of the particular applications being executed at the UE devices 180. For example, CU-CP 220-1 may be located at C-RAN hub 330, CU-CP 220-2 may be located in a stand-alone device having a link to C-RAN hub 330, and/or CU-CP 220-3 may be located within VCP/edge core 310. Depending on the implementation, CU-CP 220 may be co-located or integrated with one or more DUs 210 (e.g., to reduce latency for latency sensitive applications).

Figure 4:
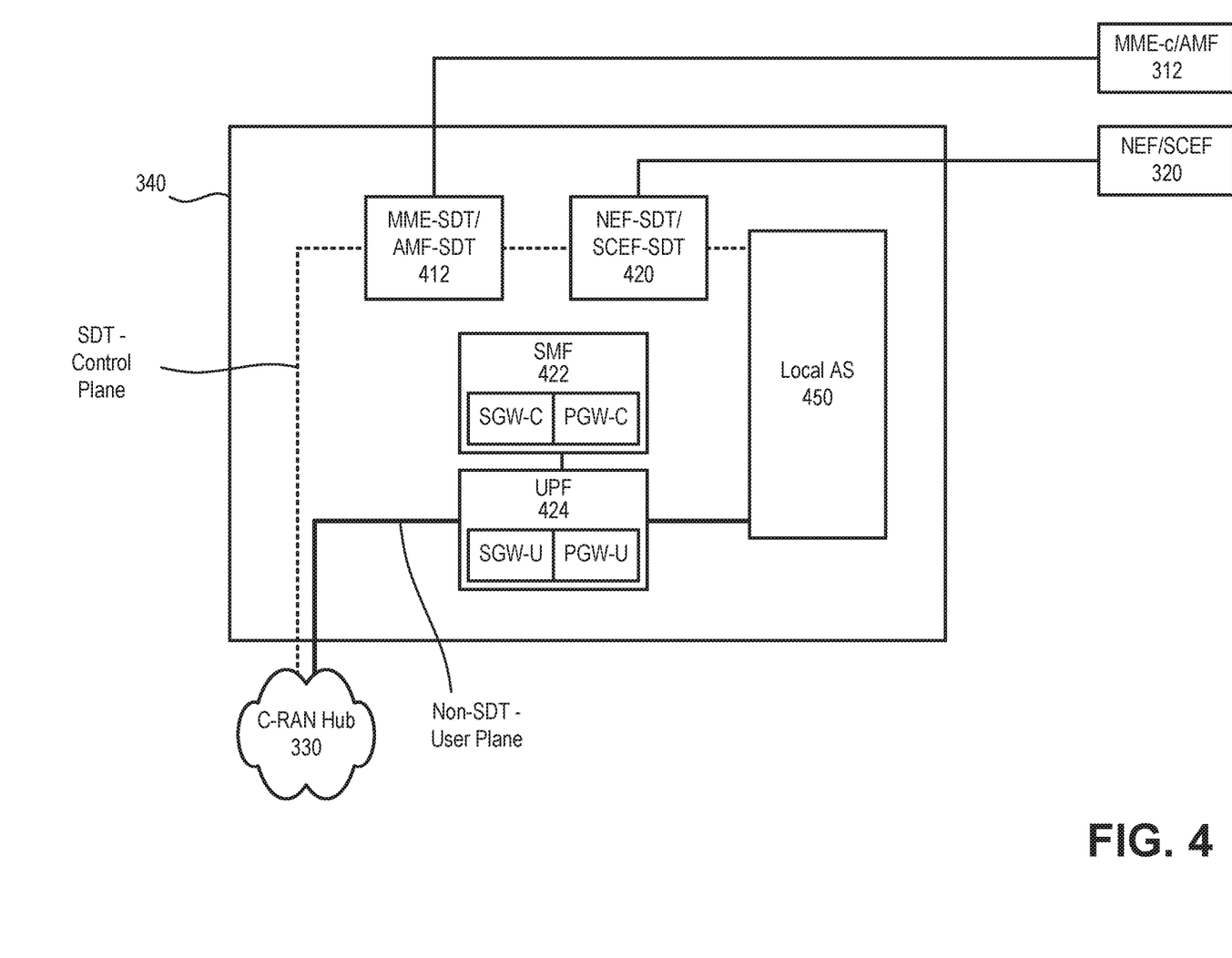
FIG. 4 is a diagram illustrating exemplary components and communications of a MEC-far edge platform to support the short data, low latency service.

FIG. 4 is a diagram illustrating components and communications of MEC-FE 340 to support the short data, low latency service. Components of MEC-FE 340 may, in one implementation, be instantiated in one or more MEC devices 135. MEC-FE 340 may include a combined MME-short data transmission and AMF-short data transmission (MME-SDT/ AMF-SDT) function 412, a combined NEF-SDT/SCEF-SDT function 420, a MEC-implemented SMF function 422, a MEC-implemented UPF function 424, and an IoT application server 450.

MME-SDT/AMF-SDT function 412 may provide a localized function to support the short data, low latency service. MME-SDT/AMF-SDT function 412 may manage control plane communications through MEC-FE 340 for UE devices 180 that generate SDT IoT traffic. In a mobility context, MME-SDT/AMF-SDT function 412 may interface with MME-c/AMF 312 in VCP edge/core 310 and may send and receive information associated with UE devices 180. These communications may allow one MME-SDT/AMF-SDT function 412 to take over control plane processing of a UE device 180 that was serviced by another MME-SDT/AMF-SDT function 412 to keep data transmissions at a far edge.

NEF-SDT/SCEF-SDT function 420 may exchange control plane signaling with MME-SDT/AMF-SDT function 412 to provide SDT delivery. NEF-SDT/SCEF-SDT function 420 may act as a gateway for connecting UE device 180 to application server 450. NEF-SDT/SCEF-SDT function 420 may expose application-programming interfaces (APIs)

for UE devices 180 to access multiple application servers (such as local application server 450). NEF-SDT/SCEF-SDT function 420 may communicate with SCEF/NEF 320 for context and/or mobility purposes. Particularly, NEF-SDT/SCEF-SDT function 420 may provide SCEF/NEF 320 with context information to support UE device 180 transitions from MEC-FE 340 back to VCP edge/core 310 and/or another MEC-FE (not shown).

SMF function 422 may perform local functions of SMF/PGW-C/SGW-C 322 to maintain to support connections between UE device 180 and MEC FE 340. SMF function 422 may communicate with to UPF function 424 configure a user plane data flow for MEC-designated IoT traffic that exceeds SDT size limits.

UPF function 424 may perform local functions of UPF/PGW-U/SGW-U 324 to provide user plane functionality for 4G and 5G network access. UPF function 424 may process MEC-designated IoT traffic that is exceeds SDT size limits.

Local application server (AS) 450 may include a local instantiation of application server 350 that provides services to UE devices 180. For example, local application server 450 may support IoT applications and collect data from UE device 180. Local application server 450 may communicate with application server 350 to transfer collected data, receive instructions, provide updates, etc.

Figure 5:
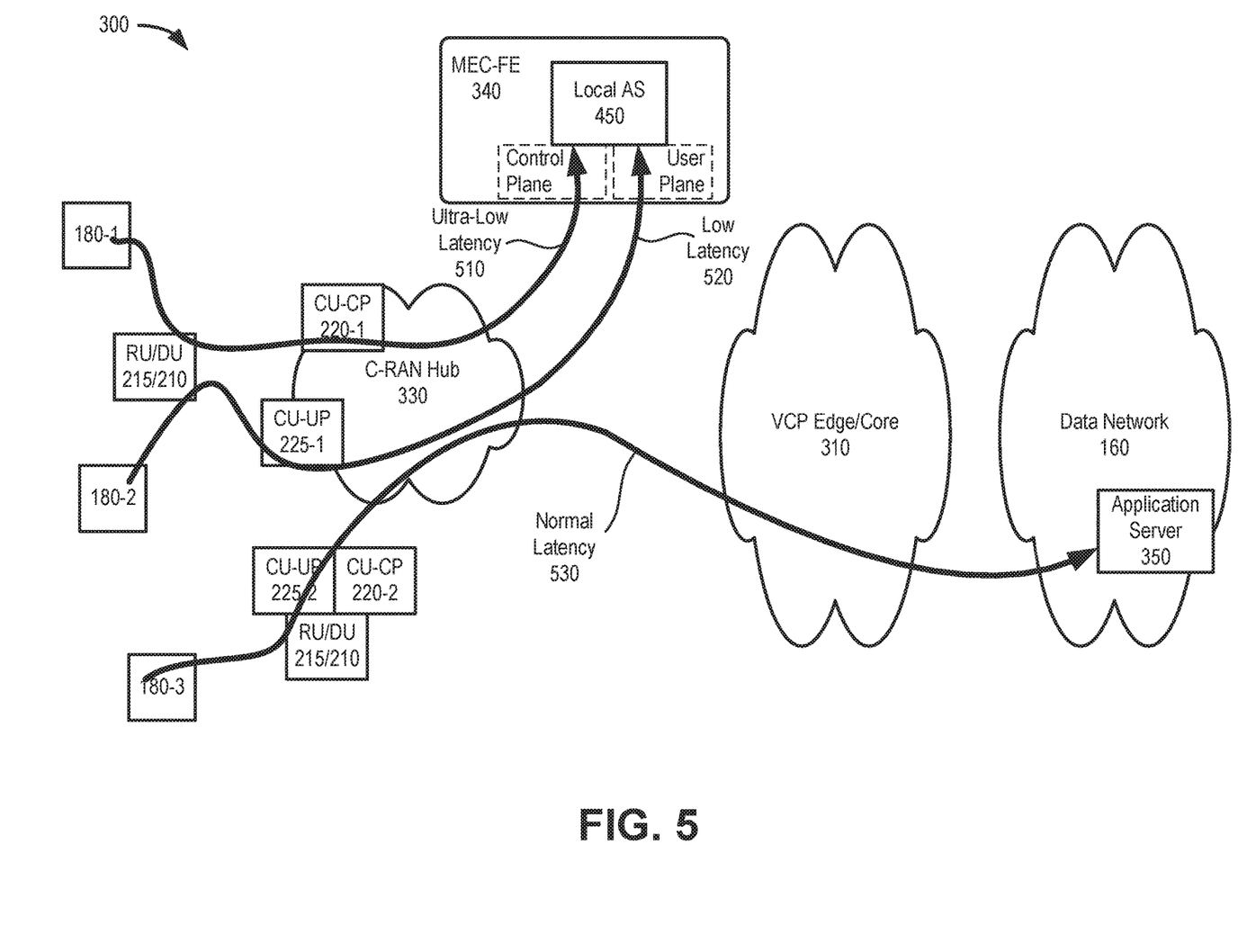
FIG. 5 is a diagram illustrating an example of potential latencies associated with data transport from a UE device in the network configuration of FIG. 3.

FIG. 5 illustrates an example of potential latencies associated with data transport from a UE device in the network configuration of FIG. 3. Assume in FIG. 5 that UE device 180-1 is configured for MEC service and generates SDT IoT traffic (e.g., packets with less than about 250 bytes), that UE device 180-2 is configured for MEC service and generates non-SDT IoT traffic (e.g., packets larger than about 250 bytes), and that UE device 180-3 is not configured for MEC services.

Data flow path 510 illustrates an ultra-low latency path for SDT traffic using the short data, low latency service. Data flow path 510 provides a connection between UE device 180-1 and local application server 450. By eliminating control plane communications to VCP/edge core 310 and setting up both a control plane and a user plane within MEC-FE 340, communications over data flow path 510 may achieve ultra-low latency.

Data flow path 520 may provide user plane communications through MEC-FE 340 to access local application server 450 with non-SDT traffic (e.g., data packet sizes above about 250 bytes). Data flow path 520 may achieve the low latency benefits of the localized MEC-FE 340, but incurs slightly longer connection setup (e.g., compared with data flow path 510) for a user plane through MEC-FE 340.

Data flow path 530 may provide communications through VCP edge/core 310 to application server 350 for services not configured for MEC (or MEC-FE) use. Data flow path 530 may achieve the normal latency typical of core network connections, which are typically longer than those achieved use MEC-based communications of data flow path 510 or data flow path 520 due to the more centralized location of the network devices in VCP edge/core 310 and/or application server 350. In some implementations, data flow path 530 may provide separate control plane (e.g., data over non-access spectrum) and user plane data flows.

VCP/edge core 310 (e.g., MME-c/AMF 312) may assign one of data flow paths 510, 520, or 530 at the time of attachment based on the transport performance required by the user profile of a UE device 180, and/or required by the service or application, associated with the traffic. The required transport performance may be associated with a PLMN-ID, SPID, BSID, traffic types, NSSAI, etc., for a UE device 180

Figure 6:
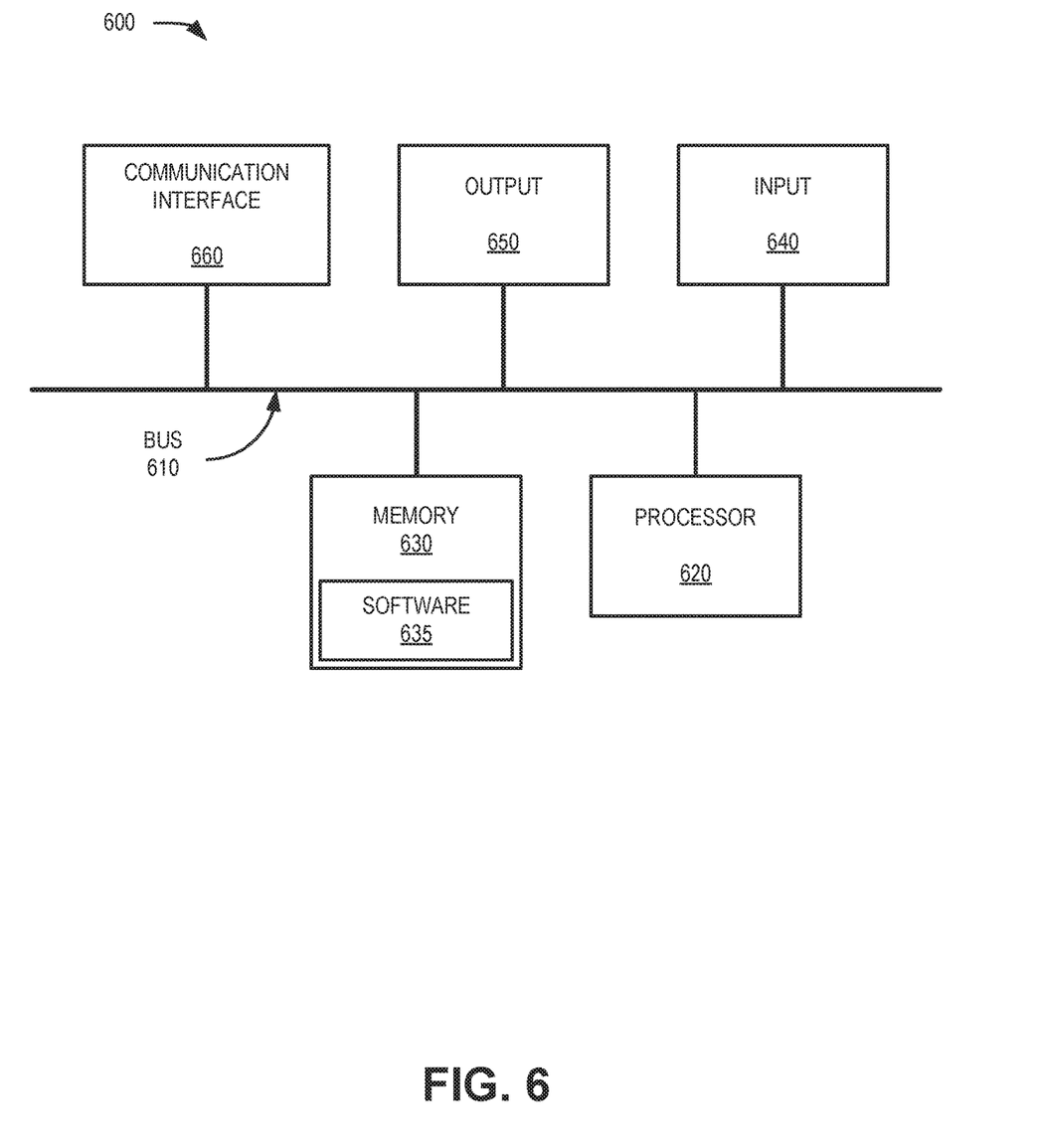
FIG. 6 is a diagram of exemplary components of a device that may be included in the network environment of FIG. 1.

FIG. 6 is a diagram of exemplary components of a device 600. Device 600 may execute functions of wireless station 110 (e.g., including DU 210, RU 215, CU-CP 220, and CU-UP 225), MEC device 135, network device 155, and network device 165. Device 600 may additionally execute functions of VCP edge/core 310, C-RAN hub 330, or MEC-FE 340. As shown in FIG. 6, device 600 may include a bus 610, a processor 620, a memory 630, an input device 640, an output device 650, and a communication interface 660.

Bus 610 may include a path that permits communication among the components of device 600. Processor 620 may include a processor, a microprocessor, an application specific integrated circuit (ASIC), a field programmable gate array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 600 and/or executing programs/instructions. Memory 630 may include any type of dynamic storage device that may store information and instructions, for execution by processor 620, and/or any type of non-volatile storage device that may store information for use by processor 620.

Software 635 includes an application or a program that provides a function and/or a process. Software 635 is also intended to include firmware, middleware, microcode, hardware description language (HDL), and/or other form of instruction. By way of example, when device 600 is an end device 180, software 635 may include an application that is configured to use MEC services.

Input device 640 may include a mechanism that permits a user to input information to device 600, such as a keyboard, a keypad, a button, a switch, touch screen, etc. Output device 650 may include a mechanism that outputs information to the user, such as a display, a speaker, one or more light emitting diodes (LEDs), etc.

Communication interface 660 may include a transceiver that enables device 600 to communicate with other devices and/or systems via wireless communications, wired communications, or a combination of wireless and wired communications. For example, communication interface 660 may include mechanisms for communicating with another device or system via a network. Communication interface 660 may include an antenna assembly for transmission and/or reception of radio frequency (RF) signals. For example, communication interface 660 may include one or more antennas to transmit and/or receive RF signals over the air. In one implementation, for example, communication interface 660 may communicate with a network and/or devices connected to a network. Alternatively or additionally, communication interface 660 may be a logical component that includes input and output ports, input and output systems, and/or other input and output components that facilitate the transmission of data to other devices.

Device 600 may perform certain operations in response to processor 620 executing software instructions (e.g., software 635) contained in a computer-readable medium, such as memory 630. A computer-readable medium may be defined as a non-transitory memory device. A non-transitory memory device may include memory space within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The configuration of components of device 600 illustrated in FIG. 6 is for illustrative purposes only. Other configurations may be implemented. Therefore, device 600 may include additional, fewer and/or different components, arranged in a different configuration, than depicted in FIG. 6.

Figure 7:
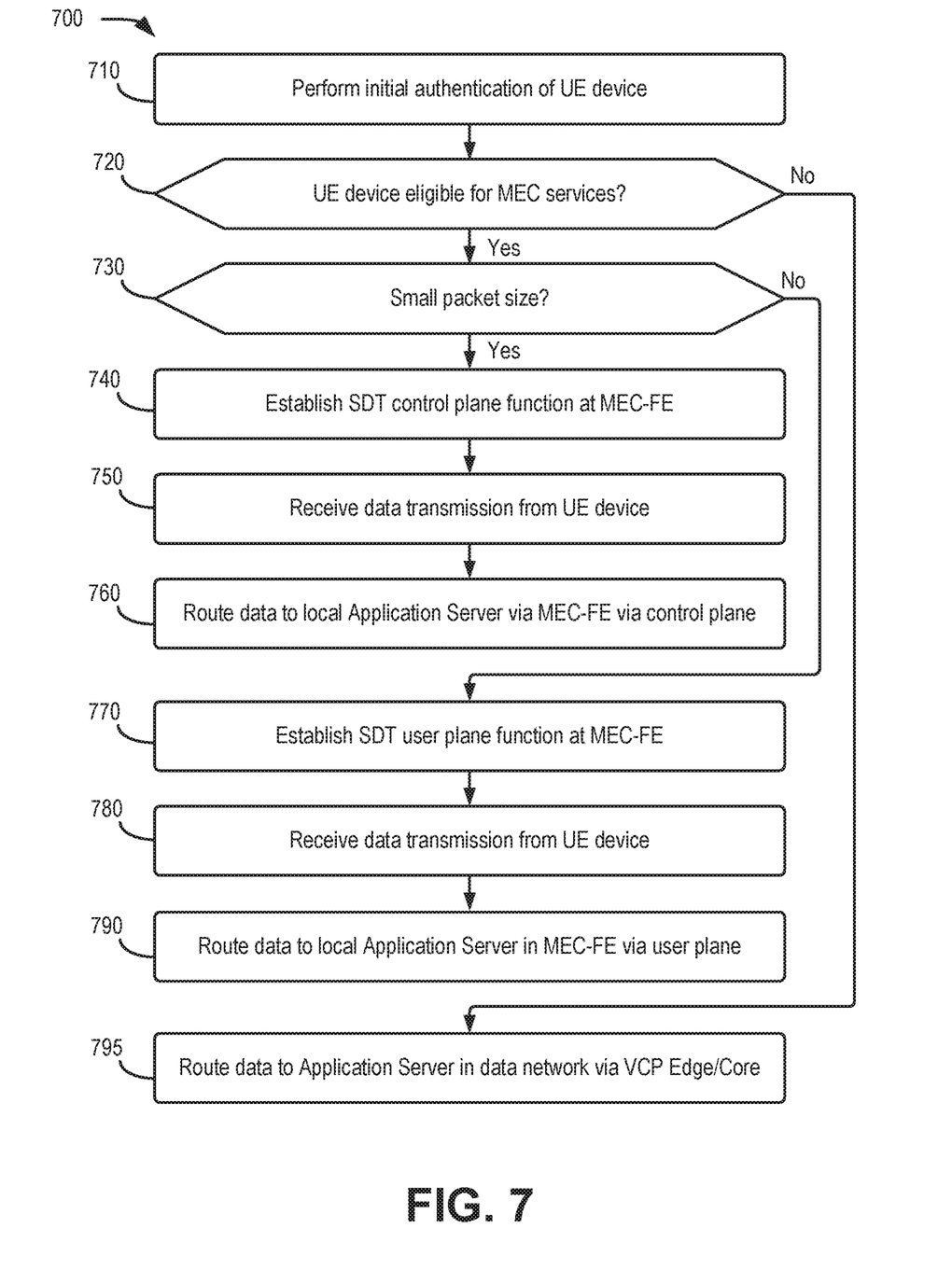
FIG. 7 is a flow diagram illustrating exemplary processes for providing a short data, low latency service, according to an implementation described herein.

FIG. 7 is a flow diagram illustrating an exemplary process 700 for implementing a short data, low latency service for a MEC network. In one implementation, process 700 may be performed by MEC-FE 340. In another implementation, process 700 may be performed by MEC-FE 340 in conjunction with one or more other network devices in network environment 300.

Process 700 may include performing an initial authentication for a UE device (block 710), and determining whether the UE device is eligible for MEC services (block 720). For example, UE device 180 may provide an attach request to establish a radio link connection with a wireless station 110, which may, in turn, send the request to MME-c/AMF 312. MME-c/AMF 312 may conduct an authentication process for UE device 110. Based on a subscription profile, application type, or another identifier, MME-c/AMF 312 may determine if UE device 180 is eligible for MEC-based services.

If the UE device is eligible for MEC services (block 720—Yes), process 700 may include detecting if the data transmissions from the UE device use a small packet size (block 730). For example, depending on the type of data or the type of UE device, UE device 110 may include a data size indicator (e.g., PLMN-ID, SPID, etc.) that indicates a data size range (e.g., SDT or non-SDT) used by UE device 110. MME-c/AMF 312 may read the data size indicator and determine a routing preference (e.g., control plane or user plane) through MEC-FE 340.

If the data transmission has a small packet size (block 730—Yes), process 700 may further include establishing SDT control plane functions at a MEC-FE (block 740), receiving a data transmission from the UE device (block 750), and routing the data to the local application server in the MEC-FE via the control plane (block 760). For example, MME-c/AMF 312 or another device in VCP edge/core 310 may provide information to MEC network 130 (e.g., a MEC orchestrator, not shown) to activate or instantiate IoT data functions on MEC-FE 340, if necessary. A particular MEC-FE 340 may be selected, for example, based on geographic proximity to the wireless station 110 serving UE device 180. For SDTs, MEC-FE 340 may activate one or more of MME-SDT/AMF-SDT function 412, NEF-SDT/SCEF-SDT function 420, and local application server 450, if not already present. MEC network 130 may identify a network address for local application server 450 in MEC-FE 340, which may be provided to UE device 180. UE device 180 may use the network address to send a data packet (e.g., within the SDT size threshold) via wireless station 110 to local application server 450 in MEC-FE 340. Wireless station 110 may route the data packet via the control plane functions (e.g., MME-SDT/AMF-SDT 412) for MEC-FE 340.

If the data transmission does not have a small packet size (block 730—No), process 700 may further include establishing SDT user plane functions at the MEC-FE (block 770), receiving a data transmission from the UE device (block 780), and routing the data to the local application server in the MEC-FE via the user plane (block 790). For example, MME-c/AMF 312 or another device in VCP edge/core 310 may provide information to MEC network 130 (e.g., a MEC orchestrator, not shown) to activate or instantiate IoT data functions on MEC-FE 340, if necessary. The particular MEC-FE 340 may be selected, for example, based on geographic proximity to the wireless station 110 serving UE device 180. For non-SDTs, MEC-FE 340 may activate one or more of SMF function 422, UPF function 424, and local application server 450, if not already present. MEC network 130 may identify a network address for local application server 450 in MEC-FE 340, which may be provided to UE device 180. UE device 180 may use the network address to send larger data packets (e.g., over the SDT size threshold) via wireless station 110 to local application server 450 in MEC-FE 340. Wireless station 110 may route the data packet via the user plane functions (e.g., UPF function 424) for MEC-FE 340.

If the UE device is not eligible for MEC services (block 720—No), process 700 may include routing the data to an application server in the data network via the VCP edge/core network (block 795). For example, if MME-c/AMF 312 detects that user device 180 is not subscribed for MEC services, MME-c/AMF 312 may direct routing of data from UE device 180 to application server 350 through VCP edge/core 310 and data network 160.

Systems and methods described herein provide a short data, low latency service using a MEC network. A network device receives, in a core network, an attach request from an end device and detects whether a packet size range for data transmissions from the end device is within a configured size threshold. The network device directs, when the packet size is within the configured size threshold, routing of the data transmissions via a control plane function of the edge network to a local instance of an application server in the edge network. The network device directs, when the packet size is over the configured size threshold, routing of the data transmissions via a user plane function of the edge network to a local instance of an application server in the edge network.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 620, etc.), or a combination of hardware and software (e.g., software 635).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 620) of a device. A non-transitory storage medium includes one or more of the storage mediums described in relation to memory 630.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
   receiving, by a network device in a core network, an attach request from an end device;
   detecting, by the network device, whether a packet size for data transmissions from the end device is within a configured size threshold;
   directing, by the network device when the packet size is within the configured size threshold, routing of the data transmissions via a control plane function of an edge network to a local instance of an application server in the edge network; and
   directing, by the network device when the packet size is over the configured size threshold, routing of the data transmissions via a user plane function of the edge network to the local instance of the application server in the edge network.

2. The method of claim 1, wherein directing routing of the data transmissions via the control plane function includes directing routing of the data transmission to one or more of:
   a local instance of a mobility management entity (MME) executing on one or more network devices of the edge network, or
   a local instance of an access and mobility management function (AMF) executing on the one or more network devices of the edge network.

3. The method of claim 1, wherein directing routing of the data transmissions via the control plane function includes directing routing of the data transmission to one or more of:
   a local instance of a network exposure function (NEF) executing on one or more network devices of the edge network, or
   a local instance of a service capability exposure function (SCEF) executing on the one or more network devices of the edge network.

4. The method of claim 1, wherein directing routing of the data transmissions via the user plane function includes directing routing of the data transmission to one or more of:
   a local instance of a packet data network gateway (PGW) on one or more network devices of the edge network, or
   a local instance of a user plane function (UPF) on the one or more network devices of the edge network.

5. The method of claim 1, further comprising:
   authenticating, by the network device, the end device; and
   providing, to the end device and based on the authenticating, a network address for the local instance of the application server.

6. The method of claim 1, further comprising:
   associating the end device with an edge location for the edge network, wherein the edge location includes a closest edge location to a wireless station servicing the end device.

7. The method of claim 6, wherein the wireless station is included within a centralized-radio access network (C-RAN) hub.

8. The method of claim 1, wherein the configured size threshold is a configurable value of up to about 500 bytes.

9. The method of claim 1, further comprising:
   instantiating, on one or more devices in the edge network, the control plane function and the user plane function.

10. The method of claim 1, wherein detecting whether a packet size for data transmissions from the end device is within a configured size threshold comprises:
matching a data size limit to one or more of a public land mobile network identifier (PLMN-ID), a subscriber profile identifier (SPID), a bootstrap server identifier (BSID), a traffic type, or network slice selection assistance information (NSSAI) associated with the end device.

11. A network device, comprising:
a communications interface;
a memory to store instructions; and
one or more processors, coupled to the memory, wherein the one or more processors execute the instructions to:
receive, in a core network, an attach request from an end device;
detect whether a packet size for data transmissions from the end device is within a configured size threshold;
direct, when the packet size is within the configured size threshold, routing of the data transmissions via a control plane function of an edge network to a local instance of an application server in the edge network; and
direct, when the packet size is over the configured size threshold, routing of the data transmissions via a user plane function of the edge network to the local instance of the application server in the edge network.

12. The network device of claim 11, wherein, when directing routing of the data transmissions via the control plane function, the one or more processor is configured to:
activate a local instance of a mobility management entity (MME) on one or more network devices of the edge network, or
activate a local instance of an access and mobility management function (AMF) on the one or more network devices of the edge network.

13. The network device of claim 11, wherein, when directing routing of the data transmissions via the control plane function, the one or more processor is configured to:
activate a local instance of a network exposure function (NEF) on one or more network devices of the edge network, or
activate a local instance of a service capability exposure function (SCEF) on the one or more network devices of the edge network.

14. The network device of claim 11, wherein, when directing routing of the data transmissions via the user plane function, the one or more processor is configured to:
activate a local instance of a packet data network gateway (PGW) on one or more network devices of the edge network, or activate a local instance of a user plane function (UPF) on the one or more network devices of the edge network.

15. The network device of claim 11, wherein the one or more processors further execute the instructions to:
authenticating, by the network device, the end device; and
providing, to the end device, a network address for the local instance of the application server.

16. The network device of claim 11, wherein the one or more processors further execute the instructions to:
instantiate, on one or more devices in the edge network, the local instance of the application server.

17. The network device of claim 11, wherein the one or more processors further execute the instructions to:
instantiate, on one or more devices in the edge network, the control plane function and the user plane function.

18. A non-transitory computer-readable storage medium storing instructions executable by a processor of a device, the instructions comprising:
receiving, in a core network, an attach request from an end device;
detecting whether a packet size for data transmissions from the end device is within a configured size threshold;
directing, when the packet size is within the configured size threshold, routing of the data transmissions via a control plane function of an edge network to a local instance of an application server in the edge network; and
directing, when the packet size is over the configured size threshold, routing of the data transmissions via a user plane function of the edge network to the local instance of the application server in the edge network.

19. The non-transitory computer-readable storage medium of claim 18, the instructions further comprising:
authenticating the end device; and
providing, to the end device, a network address for the local instance of the application server.

20. The non-transitory computer-readable storage medium of claim 18, the instructions further comprising:
associating the end device with an edge location for the edge network, wherein in the edge location includes a closest edge location to a wireless station servicing the end device.

* * * * *